United States Patent [19]

Atterbury et al.

[11] Patent Number: 5,249,742
[45] Date of Patent: Oct. 5, 1993

[54] COOLANT CIRCULATION SYSTEM FOR ENGINE HEAT PUMP

[75] Inventors: William G. Atterbury, West Worthington; Douglas E. Boyd, Dublin; Jan B. Yates, Reynoldsburg, all of Ohio; Lee R. Van Dixhorn, Ambato, Ecuador

[73] Assignee: Gas Research Institute, Chicago, Ill.

[21] Appl. No.: 919,037

[22] Filed: Jul. 24, 1992

[51] Int. Cl.⁵ ........................................ G05D 23/00
[52] U.S. Cl. ........................ 237/2 B; 237/12.3 B; 62/323.1; 62/238.7
[58] Field of Search ............... 62/323.1, 324.1, 238.6, 62/238.7, 324.4; 165/18, 29, 43; 237/2 B, 12.1, 12.3 R, 12.3 B, 12.3 C

[56] References Cited

U.S. PATENT DOCUMENTS 4,498,622  2/1985  Harnish .................. 237/2 B
5,003,788  4/1991  Fischer .................. 62/238.7

Primary Examiner—John M. Sollecito
Attorney, Agent, or Firm—Watkins, Dunbar & Pollick

[57] ABSTRACT

A coolant fluid circulation subsystem for engine driven heat pump systems including a coolant fluid loop through the engine and a recuperator, and through a thermostatic control valve operable to convey and to modulate flow from a coolant reservoir during engine operation, with the coolant fluid being selectively switchable, between first or second heat exchangers in heat exchange relation with the indoor and outdoor ambient condition selectively. An auxiliary pump and coolant fluid heater are provided in the subsystem to increase the heat contained in the coolant fluid and to exchange heat to the indoor ambient condition.

10 Claims, 1 Drawing Sheet

COOLANT CIRCULATION SYSTEM FOR ENGINE HEAT PUMP

FIELD OF THE INVENTION

This invention relates to a method and system for circulating the engine coolant as a subsystem in an engine driven heat pump system. In particular, it relates to a method and apparatus for the circulation of engine coolant in a gas engine driven heat pump system which is used primarily to control the internal environment and comfort condition in the living quarters and working space of a structure.

BACKGROUND OF THE INVENTION

Broadly speaking, heat engine driven heat pump systems are well known and have been refined for internal space conditioning use as shown in U.S. Pat. No. 4,991,450. Because heat engines, such as natural gas driven internal combustion engines, provide excess and otherwise unused heat in the motive process subsystems have been developed which recapture otherwise waste heat which is circulating in the engine coolant. U.S. Pat. Nos. 5,003,788, 5,020,320, 5,029,449, 5,099,651 and are further examples of this type of subsystem.

Further improvements in these subsystems provide advantages in waste heat recovery to the application of such heat to the occupants of the space and in some instances for other purposes.

Traditionally heat pumps such as electric motor driven heat pumps do not have sufficient excess available heat for use in such subsystems.

Further refinements and improvements in waste heat recovery subsystems are important since they increase the overall coefficient of performance (COP) of the heat pump system as well as providing overall operational economies by reducing the amount of externally supplied auxiliary heat and increase the comfort of the delivered air. In some systems the extra heat is used for domestic water heating and other purposes. Thus, the user obtains these benefits as an "extra" from the recovery of the waste heat.

While this invention is described herein in association with a gas fueled internal combustion engine, broader applications to other "heat" engines, such as turbines, may be possible. The coolant fluid employed in the subsystem may be one of various conventional types, such as ethylene glycol.

SUMMARY OF THE DISCLOSURE

In summary this invention is a coolant circulation subsystem for a heat engine heat pump system comprising: a refrigeration cycle heat pump compressor driven by a heat engine with an engine coolant subsystem in fluid connection with the heat engine including an engine exhaust recuperator in thermal connection with the engine exhaust and to receive coolant flow in the subsystem from the engine. A thermostatic coolant control valve is in fluid connection with the recuperator to receive and control the coolant fluid in response to the temperature of the coolant fluid. Also included in the subsystem is a first pump driven by the engine in fluid connection with the thermostatic control valve to convey coolant fluid to the engine and complete a first loop circuit, which is operable by the control of the thermostatic control valve to warm or cool the engine more rapidly when the subsystem operation will benefit therefrom.

Also included in the subsystem is a coolant fluid reservoir in fluid connection with an inlet of the thermostatic control valve to supply the coolant fluid to the engine as required to warm or cool the engine by modulation of coolant flow through the thermostatic control valve. The invention further includes a switching valve in connection with the recuperator to receive coolant fluid. The switching valve is also in connection with a first heat exchanger in heat exchange relation to an ambient sink or source; and in connection with a second heat exchanger in heat exchange relation to a heating or cooling load, to selectively switch the coolant flow to the first heat exchanger in the cooling mode of operation or to the second heat exchanger in the heating mode of operation.

Also included is a first conduit means connecting the first heat exchanger and the reservoir to return coolant fluid to the reservoir in the cooling mode of operation. And a second pump is provided in the connection between the switching value and the second heat exchanger to supply coolant fluid through the second exchanger to an auxiliary heating means with a second conduit means is provided connecting the auxiliary heating means to the reservoir to flow auxiliary heated coolant in the heating mode of operation.

There is also provided a third conduit connecting the reservoir to the second pump through a check valve to supply auxiliary heated coolant fluid to the subsystem during the heating mode of operation by selective operation of the second pump and of the auxiliary heating means.

The foregoing and other advantages of the invention will become apparent from the following disclosure in which the preferred embodiment of the invention is described in detail and illustrated in the accompanying drawings. It is contemplated that variations and procedure, structural features and arrangement of parts may appear to those skilled in the art without departing from the scope or sacrificing any of the advantages of the invention.

Figure 1:
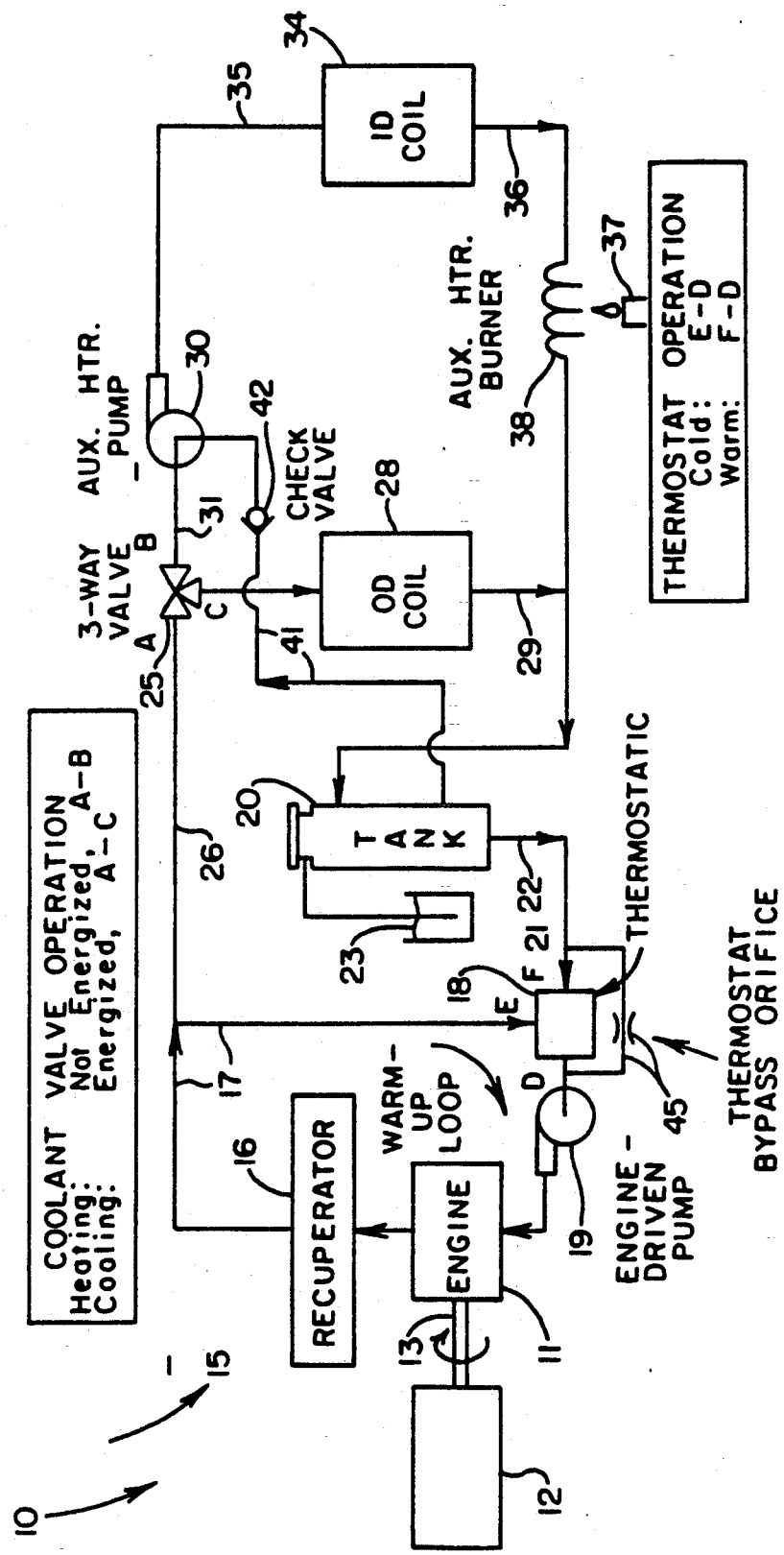
FIG. 1 is a schematic drawing of one embodiment of the system and subsystem of the invention.

DETAILED DESCRIPTION OF A PREFERRED EMBODIMENT OF A BEST MODE OF THE PRACTICE OF THE INVENTION.

Referring to FIG. 1, a heat pump system, referred to generally as 10 includes a heat engine 11 mechanically connected to a refrigerant cycle compressor 12 by a mechanical rotational means 13. The engine 11 is preferably a natural gas fueled internal combustion engine This has been successfully used in a developmental example system, but there could be other types of heat engines to which the invention would be applicable and useful.

The compressor means 12 of the heat pump system 10 is preferably of the vapor compression refrigeration cycle type that is employed in a conventional heat pump system constructed to provide cooling and dehumidifying at an indoor heat exchanger coil in a cooling mode of operation; or to provide heat to a load in a heating mode of operation, with heat pumping from an outdoor heat exchanger which operates to exchange heat with outside ambient air as a source of heat or a heat sink.

This invention relates to a subsystem indicated generally as 15 to provide additional heating or cooling to the total heat pump system by capturing heat from the engine 11 that is generated in the combustion process but not used to drive the compressor 12. This so called waste heat is captured from the engine itself and from a recuperator 16 which is connected to the engine. The recuperator 16 receives a coolant fluid flowing through a network of connections and conduits to be further described. The recuperator 16 may be a muffler of the engine 11 or other mechanical component of the engine capable of radiating and exchanging heat to the coolant fluid.

A connection 17 is provided between the recuperator 16 and a thermostatic coolant fluid control means 18 which is connected to receive and control the coolant fluid flow in response to the temperature of the coolant fluid flowing therein.

The thermostatic control means 18 maybe of the bimetallic spring loaded type, or of other construction which responds to open, modulate, and control a flow of coolant fluid as it is conveyed to a first pump means 19 and thence return to the engine 11 by a connection thereto.

The recuperator 16, connections 17, thermostatic control means 18, and first pump means 19 constitute a coolant fluid "loop" circuit hereafter termed the warm-up loop, which is operable by the control of the thermostatic means 18 to warm or cool the engine 11 temperature more rapidly when the subsystem operations will benefit therefrom.

A coolant fluid reservoir means 20, which is shown in the form of a tank, is connected to an inlet 21 of the control means 18 by a connection 22. The reservoir means 20 is maintained replenished as necessary from an ambient overflow tank 23. The thermostatic control means 18 is operable to warm or control the engine temperature by modulating flow between coolant fluid from the warm-up loop or from the reservoir 20 as required to provide coolant fluid to the engine and to maintain the engine operating temperature at or near optimum thermal efficiency through the various facets of engine operation, from start-up to full-load in steady state or intermittent operating situations.

Although not shown, the engine is provided with the usual combustion and ignition controls which operate by sensing and responding to load conditions in the conditioned space environment with which the heat pump system 10 is associated.

Further in the subsystem 15, a coolant fluid switching valve means 25 is connected to the recuperator 16 by a conduit connection 26. A first heat exchanger 28 is connected to an outlet of a switching valve means 25. The first heat exchanger 28 is in heat exchange relation to a heat source or sink, such as outdoor ambient air. Heat exchanger 28 is connected by connections 29 to the reservoir means 20.

In the cooling mode of operation fluid heat is exchanged with outdoor air in the first heat exchanger 28 before being conveyed to the reservoir means 20. From the reservoir 20, flow to the engine 11 is modulated and controlled by the thermostatic control means 18.

In most circumstances, during the cooling mode of operation except during warm-up, coolant fluid will circulate under the influence of first pump means 19 through the outdoor first heat exchanger 28 and the warm-up loop will be closed by the thermostatic control means 18.

A second pump means 30 is connected to the coolant fluid switching valve means 25 by a connection 31. In the normal heating mode, coolant is flowed through the second pump means 30 by the first pump means 19 then flowed to the second heat exchanger 34 through connection 35. The second heat exchanger 34 is in heat exchange relation to a heating or cooling load such as the indoor air in the conditioned space to which the heat pump system 10 is connected. Conventionally, the second heat exchanger 34 may be a finned coil in the air duct of a forced air heating and cooling system. Heat exchanger 34 is connected by means of a connection 36 to an auxiliary heater, such as a gas burner 37, in association with a heat exchange coil 38. The coil 38 is connected to the reservoir means 20.

In the heating mode of operation by selective and controlled operation of the second pump means 30, and the auxiliary heater means 38, additional heat is supplied to the coolant fluid, in which the coolant fluid is drawn from the coolant tank 22 through connection 41 and check valve 42 to increase the supply of heat at the second heat exchanger 34 and to the load.

As a control measure an orificed bypass connection 45 may be provided to assure that a small quantity of coolant fluid is always available to the engine under all operating conditions so that the coolant may be appropriately circulated during preheat and engine warm-up.

Operationally, the subsystem of this invention provides improvements in many of the total system operating parameters. A gas engine heat pump operating to condition the internal environment of a building, is required to start and stop frequently in response to changes in outdoor ambient conditions and indoor space changing conditions. It is well known that heat engines are relatively less efficient in start-up conditions because engine temperatures are not at their peak operational conditions and the engine coolant may have returned to ambient conditions.

A feature of this invention is that the warm-up loop operates to bring the coolant to optimum operating temperature very quickly. When the engine warms to operating temperature, further heat energy of the coolant is immediately available to the indoor heat exchanger, or maybe dissipated to the outdoor ambient air conditions through the outdoor heat exchanger.

In addition, when the engine is cold in early warm up operation, the coolant valve means 25 can be switched to flow coolant the second heat exchanger to supply warm coolant fluid to the second heat exchanger when the heat pump is operating in the cooling mode to improve the dehumidification capabilities of the system.

It has been noted in the operation of the subsystem 15 in an operational example system, that there are the following advantages over similar systems including:

The auxiliary heat function provided by the second pump means 30 and auxiliary means 38 is not affected by the proper operation of either the coolant switching valve means 25 or the thermostatic control means 18. In earlier versions of coolant fluid subsystems, it had been noted that in the operations switch over from heating to cooling or vice versa, and at the start, the second pump means can cause overdriving of the first pump means 19, which can cause decoupling of the first pump means 19. In the embodiment shown in FIG. 1 this has not been the experience.

Higher temperature thermostatic control valves may be used permitting an improvement in the engine brake thermal efficiency. At the same time, the peak coolant temperatures in the system are reduced and the coolant life is extended. The thermal cyclic losses are decreased, and the COP of the total system is thus improved.

The engine warm-up loop may be reduced in size and the coolant volume therein reduced to reduce the cost of piping and hardware while still decreasing engine warm-up time.

In the subsystem shown in FIG. 1 a decoupling phenomenon between the engine driven first pump means and the auxiliary heater second pump means is eliminated when the second pump draws coolant fluid directly from the tank 20 through connection 41 thus bypassing the first pump means 19.

Cyclic and steady state operating efficiencies are improved in the subsystem, and capability of purging air from the second heat exchanger is improved.

It is herein understood that although the present invention has been specifically disclosed with the preferred embodiments and examples, modifications and variations of the concepts herein disclosed may be resorted to by those skilled in the art. Such modification and variations are considered to be within the scope of the invention and the appended claims.

We claim:

1. A heat engine driven heat pump system comprising:
    a) a refrigeration cycle heat pump compressor driven by a heat engine means;
    b) a coolant fluid circulation subsystem including a recuperator means in fluid connection with the heat engine to receive a coolant fluid flowed from the engine;
    c) a thermostatic coolant fluid control means in fluid connection with the recuperator means to receive through a first inlet and control the coolant fluid flow in response to the temperature of the coolant fluid;
    d) a first pump means driven by the engine in fluid connection with the thermostatic fluid control means to convey coolant fluid to the engine and complete a first loop circuit, operable by the control of the thermostatic means to warm or cool the engine more rapidly when the subsystem operation will benefit therefrom;
    e) a coolant fluid reservoir means in fluid connection with a second inlet of the thermostatic control means to supply coolant fluid to the engine means as required to warm or cool the engine means by modulation of coolant fluid flow through the thermostatic control means;
    f) a switching valve means in connection with the recuperator means to receive coolant fluid and in connection with
        A) a first heat exchanger in heat exchange relation to an ambient heat source or sink, or with a
        B) a second heat exchanger in heat exchange relation to a heating or cooling load,
            to selectively switch the coolant fluid flow to the first heat exchanger in the cooling mode of operation or to the second heat exchanger in the heating mode of operation;
    g) a first conduit means connecting the first heat exchanger and the reservoir means to return coolant fluid to the reservoir means in the cooling mode of operation;
    h) a second pump means in the connection between switching valve means and the second heat exchanger means to supply coolant fluid through the second heat exchanger means to an auxiliary heating means, with a second conduit means connecting the auxiliary means to the reservoir means to flow auxiliary heated coolant fluid to the subsystem in the heating mode of operation; and
    i) a third conduit means connecting the reservoir means to the second pump means through a check valve means to supply coolant fluid to the subsystem during the heating mode of operation by selective operation of the second pump means and the auxiliary heating means.

2. A system according to claim 1 wherein an orificed by-pass connection is provided between the reservoir means and the first pump means to permit circulation during engine warm-up and engine preheat.

3. A system according to claim 2 wherein the auxiliary heat means is located in the connection between the auxiliary heat pump means and the second heat exchanger.

4. A system according to claim 2 wherein the coolant valve means is switched to flow coolant to the second heat exchanger to supply warm coolant fluid to the second heat exchanger when the heat pump is operating in the cooling mode to improve the dehumidification capabilities of the system.

5. A system according to claim 1 wherein the heat engine means is a natural gas fueled internal combustion engine.

6. A system according to claim 1 wherein the recuperator means is a muffler attached to the engine.

7. A system according to claim 1 wherein the thermostatic cooling fluid control means is a three-way valve having inlet and two-outlets with a bimetallic element controlling flow through the valve between the outlets according to the temperature of the coolant flow in the valve.

8. A system according to claim 1 wherein the switching valve means is a three-way valve having an inlet and two outlets with a solenoid operated means to avert coolant flow between the outlets.

9. A system according to claim 1 wherein the auxiliary heating means is a gas burner and heat receiver means through which the coolant is flowed.

10. A gas fueled internal combustion engine driven heat pump system comprising:
    a) a refrigeration cycle heat pump compressor driven by a gas fueled internal combustion engine;
    b) a coolant fluid circulation subsystem including an exhaust muffler recuperator in fluid connection with the engine to receive a coolant fluid flowed from the engine;
    c) a three-way thermostatic cooling fluid control valve having inlet and two outlets with a bimetalic element controlling flow through the valve between the outlets according to the temperature of the coolant flow in the valve;
    d) A first pump driven by the engine in fluid connection with the thermostatic control valve to convey coolant to the engine and complete a warm up loop circuit, operable by the control of the thermostatic valve to warm or cool the engine more rapidly when the subsystem operation will benefit therefrom;
    e) a coolant fluid reservoir in fluid connection with a second inlet of the thermostatic control valve to supply coolant fluid to the engine as required to warm or cool the engine by modulation of coolant fluid flow through the thermostatic control valve;

f) a three-way switching valve in connection with the recuperator to receive the coolant fluid and in connection with
   A) a first heat exchanger in heat exchange relation to an ambient heat source or sink, or with a
   B) a second heat exchanger in heat exchange relation to a heating or cooling load,
   to selectively switch the coolant fluid to the first heat exchanger in the cooling mode of operation or to the second heat exchanger in the heating mode of operation and the switching valve means is a three-way valve having an inlet and two outlets with a solenoid operated means to divert coolant flow between the outlets,
g) A first conduit means connecting the first heat exchanger with the reservoir to return coolant fluid to the reservoir in the cooling mode of operation;
h) A second pump means in the connection between the switching valve and the second heat exchanger to supply coolant fluid through the second heat exchanger to an auxillary gas burner and heating coil through which the coolant is flowed, with a second conduit means connecting the auxillary means to the reservoir means to flow auxillary heated coolant fluid to the subsystem in the heating mode of operation; and
i) a third conduit means connecting the reservoir to the second pump through a check valve to supply coolant fluid to the subsystem during the heating mode of operation by selective operation of the second pump with the auxillary heating gas burner.

* * * * *